Dec. 12, 1961 F. L. HORN 3,012,849
DISSOLUTION OF ZIRCONIUM-CONTAINING FUEL ELEMENTS
Filed April 6, 1959
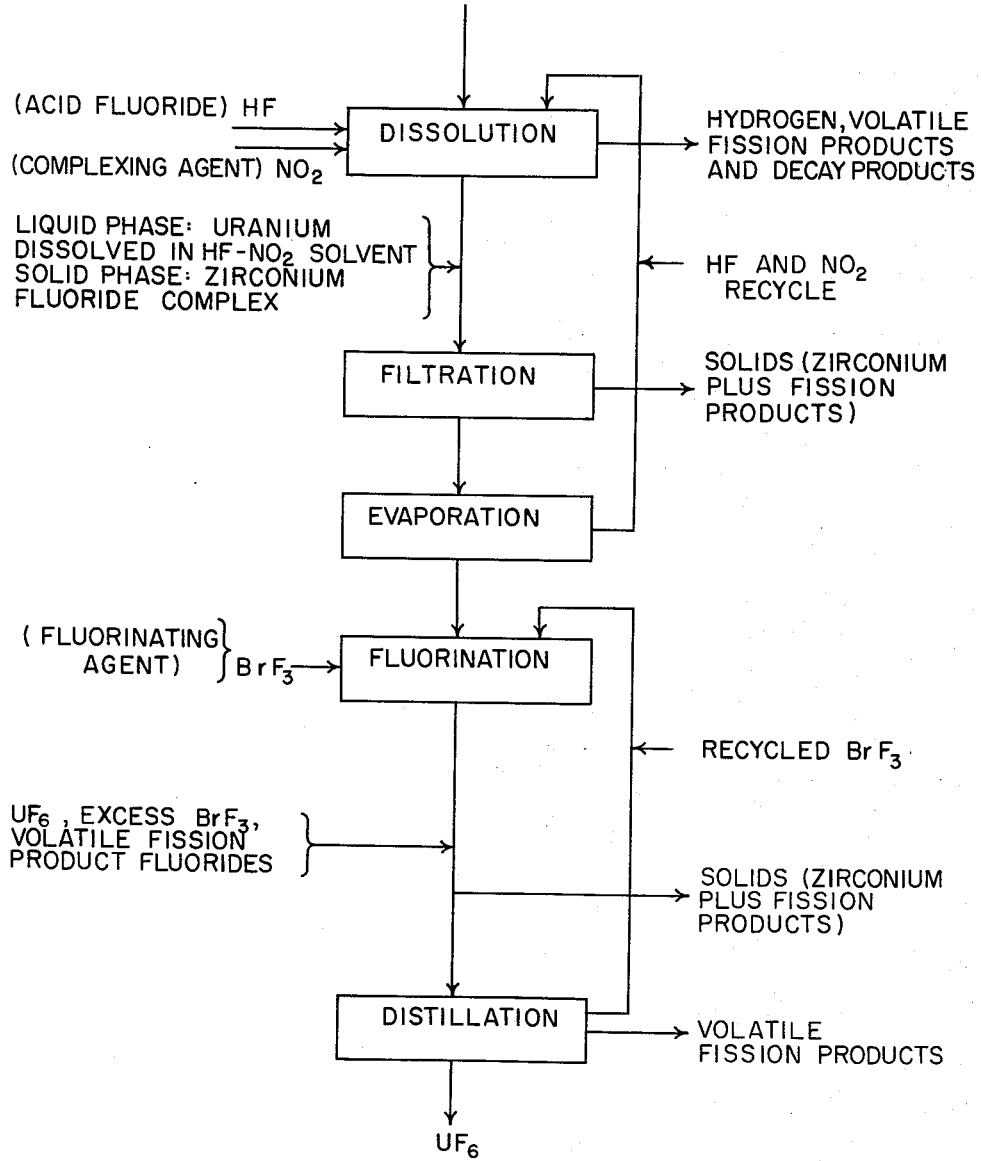
INVENTOR.
FREDERICK L. HORN

3,012,849
DISSOLUTION OF ZIRCONIUM-CONTAINING FUEL ELEMENTS

Frederick L. Horn, Sayville, N.Y., assignor to the United States of America as represented by the United States Atomic Energy Commission
Filed Apr. 6, 1959, Ser. No. 804,553
7 Claims. (Cl. 23—14.5)

The present invention relates to a method of separating and recovering uranium from spent nuclear reactor fuel elements. More particularly, the invention relates to a method of separating and recovering uranium from fuel elements in which the uranium is mixed with, alloyed with or clad with zirconium metal or alloys thereof.

In the processing of neutron-irradiated nuclear fuel elements to separate and recover the uranium from the nuclear reaction products, a highly advantageous method comprises a method the initial step of which involves dissolving the contaminated uranium in a non-aqueous halogen fluoride in the liquid phase. This dissolution step effects a partial phase separation of the uranium and certain other contaminants and converts the uranium to the halogen fluoride soluble and volatile uranium hexafluoride compound. When this is followed by one or more distillation steps, the volatile uranium hexafluoride can be separated from the solvent and any volatile impurities. Such a fluoride volatility process for the recovery of uranium is described in United States patent, Serial No. 2,830,873, dated April 15, 1956.

While the described process has wide utility in the processing of spent nuclear reactor fuel elements it cannot be used for the recovery of the uranium from fuel elements in which the uranium is alloyed with, clad with or otherwise combined with zirconium metal or alloys of zirconium. It has been found that the halogen fluoride reacts with the zirconium to form a tenacious fluoride coating thus precluding dissolution or reaction of the metal underlying the coating. For this reason, it has become necessary to turn to other processes for the recovery of uranium from reactor fuels in which the uranium is combined with zirconium metal or its alloys.

One process which is used for recovery of uranium from spent nuclear reactor fuels of the type described employs an initial step which comprises dissolving the spent fuel element in an aqueous solution of hydrogen fluoride and nitric acid. This process has a number of disadvantages. The uranium salt (uranium tetrafluoride) recovered from the dissolution step is not volatile, and further processing is required to purify the uranium and convert it to a form suitable for reconstitution into reactor fuel elements. Moreover, the dissolving medium is extremely corrosive and requires the use of unusual container materials such as an alloy of gold and nickel. It has been estimated that for each kilogram of uranium recovered from spent fuel elements containing about 0.6% by weight uranium, the remainder being zirconium, about 1,000 gallons of aqueous waste liquid is produced contaminated with radioactive fission products.

Other processes which have been used for the recovery of uranium from spent fuel elements in which the uranium is clad with or otherwise combined with zirconium or its alloys all have their complications because high temperatures and highly corrosive reagents are employed which result in excessive corrosion of the containing vessels and present the hazard of run-away reactions.

It is therefore an object of this invention to provide a novel and simple process for the recovery of uranium from spent fuel elements in which the uranium is mixed with, clad with or alloyed with zirconium metal or its alloys. A further object of this invention is to provide a process which effects dissolution of spent fuel elements of the type described at relatively low temperatures and pressures and under relatively controllable conditions. Another object of this invention is to provide a process which can use inexpensive, readily available materials for the construction of process vessels. A still further object of this invention is to provide a process for recovering uranium in a volatile form from spent fuel elements of the type in which uranium is clad with or alloyed with zirconium or its alloys. A still further object of this invention is to provide a process for recovering uranium from spent fuel elements by which the volume of waste fission products is minimized and wherein said fission products are in a concentrated and easily-handled form. Still another object of this invention is to provide a continuous process for the recovery of uranium from a mixture containing uranium and zirconium.

Certain acid fluorides, of which hydrogen fluoride (HF) and difluorophosphoric acid ($HPO_2F_2$) are examples, react with uranium under anhydrous conditions. However, the reaction of zirconium with these acids results in the formation of an essentially insoluble fluoride salt. I have found that if the uranium is clad with or alloyed with zirconium or its alloys, or otherwise combined with zirconium, the uranium cannot be separated from zirconium. Zirconium, as well as certain other metals, forms an insoluble, tightly adherent coating thus precluding further reaction to effect recovery of the uranium from the zirconium.

The present invention is predicated on the discovery that zirconium metal or a zirconium alloy can be at least partially solubilized in anhydrous acid fluorides by the addition thereto of a complexing agent thus avoiding the formation of an insoluble adherent fluoride coating on the metal surface to be treated. In the absence of a tightly adherent fluoride coating the uranium is then rendered free to react with an acid fluoride to form a soluble uranium complex compound which can be suitably treated with a halogen fluoride to form the volatile uranium hexafluoride.

In accordance with the present invention, uranium is separated from its fission products and its zirconium-containing cladding and alloying constituents by a process, the initial step of which comprises dissolving the contaminated uranium in the liquid phase of a non-aqueous solvent containing an acid fluoride and a complexing agent. The uranium is thereby converted to an acid fluoride-soluble uranium fluoride complex compound, whereas the zirconium forms a complex of limited solubility. This insoluble compound is then separated from the solution by conventional phase separation methods which may include filtration or decantation. The uranium-containing filtrate is then evaporated to dryness. The solid residue which contains uranium and a small percentage of other metal contaminants is then treated with a halogen fluoride in the liquid phase. The uranium is thereby converted to the volatile uranium hexafluoride compound. The uranium hexafluoride ($UF_6$) so formed is separated from the solvent and from any contaminating volatile fluorides by one or more distillation steps, following conventional distillation practice.

For a more complete underestanding of the invention, reference may be made to the following description and accompanying flowsheet which illustrates one embodiment of the process of the present invention. In the composition to be treated, the uranium may be uranium metal or a uranium compound such as one of its oxides. The uranium may be alloyed with another metal such as a uranium-zirconium alloy. The zirconium may form part of the core of the fuel element or part or all of the cladding. Indeed, the metal mixture may be any composition in which the uranium and zirconium are physically and/or chemically combined. In the embodiment to be described, it will be assumed that the starting material is a neutron irradiated fuel element wherein such element has a uranium core and a zirconium cladding. The spent fuel element containing uranium and zirconium is dissolved in the liquid phase in an anhydrous solution of an acid fluoride represented by the chemical compound hydrogen fluoride (HF) and a complexing agent represented by nitrogen dioxide ($NO_2$). The dissolution step is advantageously carried out at a temperature in the range of 90°–110° C. although the reaction will proceed at a satisfactory rate at a temperature of about 70° C. Higher temperatures, up to as much as 150° C., may also be used subject to strength of materials of construction. The minimum operable amount of nitrogen dioxide in the dissolution medium is about 7 mole percent; a solution of about 7–35 mole percent nitrogen dioxide and about 65–93 mole percent hydrogen fluoride is a satisfactory reactive dissolution mixture. Optimum dissolution rates are obtainable at about 20 mole percent nitrogen dioxide. There is no advantage in using solutions wherein nitrogen dioxide concentration is about 35 mole percent. Any excess over this limit causes an undue amount of gaseous reaction products to evolve and excess pressure to build up. The gaseous reaction products of the dissolution are hydrogen and volatile fission products and decay products which are vented from the dissolution chamber. The hydrogen acts as a sweep gas to remove the gaseous fission products and any entrained nitrogen dioxide. The uranium forms a soluble complex with the nitrogen dioxide while the zirconium forms a complex with nitrogen dioxide of limited solubility.

The liquid and solid phases are then separated by conventional phase separation methods. Any of the well-known methods of separating solids from liquids, such as filtration, centrifugation, fractional crystallization, etc. may be employed for this purpose. Filtration has been found to be a desirable separating procedure. The bulk of the zirconium and fission products are separated and removed from the uranium containing solution as insoluble or sparingly soluble fluorides and nitronium-complex fluoride compounds. The acid fluoride solvent contains uranium as a soluble uranium complex and a small percentage of soluble zirconium and other soluble fission product metal fluorides. The solvent is then evaporated at a temperature in the range 20°–150° C. The selection of the evaporation temperature in an operating process will depend upon such economic considerations as cost of condensers, coolant circulation means, associated piping and the like, and will be affected by such limitations as available coolant temperature, etc. Thus, for a particular plant site and local conditions of operations, it may be preferred to operate the evaporation step at elevated temperature and pressure or at a lower temperature at essentially atmospheric pressure.

The volatilized solvent which by now is essentially hydrofluoric acid can be recycled for reuse in the dissolution step. The solids are then treated with bromine trifluoride ($BrF_3$) to convert the uranium to the volatile uranium hexafluoride. It is desirable to carry out the conversion of the uranium to the hexafluoride at a temperature between 60 and 110° C. and preferably at a temperature of about 90° C. The volatile uranium hexafluoride can then be separated from any residual zirconium fluoride, fission products fluorides, bromine trifluoride and other volatile contaminants, by distillation to yield a uranium hexafluoride product which is substantially free of these contaminants.

The materials of construction for reactors to contain halogen fluorides must be selected with some care. Certain common metals such as iron, nickel, aluminum and copper have been found to form coherent protective films in the presence of halogen fluorides which make their use as construction materials practical for handling the liquid halogen fluorides. Nickel and high nickel alloys are favored as materials for reactor construction based upon corrosion resistance although aluminum, which is nearly as satisfactory from the corrosion standpoint, is less expensive and is therefore also satisfactory for this purpose.

In the dissolution step, halogen fluorides are not present. Accordingly, fluorinated hydrocarbon materials such as perfluoroethylene can be used for reactor construction and should be used where temperatures below 150° C. are encountered, as in the evaporation step.

In the present process, the acid fluorides which can be used as the dissolving medium include various acid fluorides which are liquid at or about room temperature. Hydrogen fluoride, which boils at 19.4° C. at atmospheric pressure, has been found to be satisfactory as a solvent. The hydrogen fluoride and other acid fluorides may be maintained in the liquid state by suitable adjustment of temperature and pressure. Other acid fluorides which can be used in the dissolving mixture include difluorophosphoric acid, monofluorophosphoric acid, fluophosphoric acid, factors of cost, stability, reactiveness, availability, etc., enter into the choice of a particular acid fluoride agent to be used under specific circumstances. On the basis of these and other factors, hydrogen fluoride and difluorophosphoric acid have been found to be the most satisfactory acid fluorides for use in the present process. Of these two, hydrogen fluoride has been found to be most suitable, chiefly because it may be used in the present invention at moderate temperatures and pressures, i.e., of the order of 70 to 150° C. at 1 to 20 atmospheres.

The complexing agent component of the dissolving medium can be selected from chemical compounds which readily ionize in the liquid acid fluorides to form cations capable of forming soluble or slightly soluble complex fluorides of zirconium and with other metals which form tenacious adherent fluoride coatings. Suitable complexing agents of this class include inorganic fluoride salts such as the fluorides of potassium, sodium, cesium, silver, mercury, manganese and thallium; inorganic chlorides such as those of silver and cesium; and nitrogen oxides such as nitric oxide and nitrogen dioxide. The halide salt complexing agents are presumed to react with the divalent zirconium hexafluoryl anion to yield complex double-metal hexafluorides which permit dissolution of the adherent fluoride coatings on the uranium, thus making the uranium available for reaction. Nitric oxide and nitrogen dioxide appear to act in a manner similar to the cations of the inorganic fluorides and chlorides in the formation of complex fluorides. The choice of a complexing agent is chiefly determined by its effect on the zirconium dissolution rate, extent of recovery of a uranium product, and also by ease of handling and economic considerations. Of the metal halides, KF and CsF were found to be the most desirable because their use provides a relatively high dissolution of recoverable uranium. Fluoride salts of sodium, silver and manganese did not give as high dissolution rates or percentage of uranium recovery as was the case with potassium or cesium fluoride. The use of nitric oxide or nitrogen dioxide is especially advantageous in this process since, in addition to providing a relatively high dissolution rate substantally complete uranium recovery was obtained. Furthermore, complex nitronium fluoride salts which are believed to be formed can be decomposed and the resulting nitrogen oxides recycled to the dissolution step. The inorganic fluoride and chloride salts useful as complexing agents in this process form uranium complexes which are not decomposed as readily as the nitrogen oxide complexes.

The halogen fluorides which can be used to convert the non-volatile uranium complex to the volatile hexafluoride in this process include various fluorides which are liquid at or near room temperature such as chlorine trifluoride. Othere halogen fluorides which are included within the scope of uranium fluorinating agents for this invention include bromine monofluoride, bromine trifluoride, bromine pentafluoride, and iodine pentafluoride, although for considerations of cost, stability, reactiveness, availability, etc., bromine trifluoride has been found to be the most satisfactory halogen fluoride. It has been found that the conversion of uranium complex to the volatile hexafluoride will take place so long as there is any bromine trifluoride present to react with the uranium complex. However, at least a stoichiometric amount of bromine trifluoride and generally an amount equivalent to about 100 percent in excess of the stoichiometric amount is preferably used. The amount of excess bromine trifluoride does not appear to be critical and in a large scale process will be limited by engineering and economic considerations.

With respect to the particular embodiment previously described and illustrated in the flowsheet, it will be noted that some of the steps of the process can be combined without departing from the scope of the invention. For example, the halogen fluorides can be added to the initial dissolving medium (acid fluoride and complexing agent) so that the uranium of the zirconium clad fuel element is dissolved and simultaneously converted to a volatile product. The only additional step required would be to fractionally distill the uranium hexafluoride from the fluorinating agent and other volatile components of the solvent medium. Of course, in this modification, the purified uranium hexafluoride will appear at different distillation cuts than in the previously discussed embodiment.

Having described the process, it may be further illustrated by the following examples:

EXAMPLE I

This experiment demonstrates that uranium fuel elements having a cladding of zirconium or alloys thereof can be dissolved in non-aqueous liquid phase medium at a practical rate and that the uranium can be quantitatively separated as a pure uranium hexafluoride product.

An unirradiated fuel plate section having a Zircaloy-2 cladding and containing approximately 4% uranium by weight (about 280 mgms.) was immersed in a liquid solution of 12.5 mole percent nitrogen dioxide 25 mole percent bromine trifluoride, and 62.5 mole percent hydrogen fluoride in a polyfluoroethylene container. The container was provided with an internal monel metal cooling coil for controlling the solution temperature. The solution, with the sample immersed therein, was heated to a temperature in the range 90° to 120° C. During the dissolution period, there was an initially rapid reaction while the cladding was being dissolved, followed by a slower reaction with little evolution of heat while the uranium was being dissolved.

After the sample had dissolved, the solution was transferred to another polyfluoroethylene vessel and distilled. Initially, brown fumes of nitrogen dioxide evolved and these were collected in a condenser. This was followed by white hydrogen fluoride vapor which condsensed to a clear liquid. The next fraction recovered was bromine. Finally, white, solid uranium hexafluoride was collected. After all the solution was vaporized and the solid residue was reduced to dryness, an additional volume of bromine trifluoride was added to the residue and this was distilled to recover any uranium remaining in the solids.

The residue, first and second distillate fractions, were then analyzed for uranium by colorometric methods after hydrolysis of uranium hexafluoride with nitric acid to form the uranyl nitrate. The results are summarized in Table 1 below:

Table 1

| Analytical Sample | Milligrams | Uranium Analysis, Percent |
|---|---|---|
| First Distillate | 183 | 64.5 |
| Second Distillate | 85 | 30 |
| Pot Residue | 15.5 | 5.5 |
| Total Uranium | 283.5 | 100 |

The recovery of 382.5 milligrams of uranium from the dissolution of the 7 gram specimen shows, allowing for experimental error, substantially complete recovery of uranium.

EXAMPLE II

The following example illustrates the effect of temperature on the dissolution rate of Zircaloy-2 in a nitrogen dioxide-hydrogen fluoride dissolution solvent medium.

Each sample was immersed in a solution of 11 mole percent nitrogen dioxide and 89 mole percent hydrogen fluoride at the temperature ranges indicated in Table 2 below.

The dissolution rate for each sample was calculated in accordance with the following general formula:

$$\text{Dissolution rate (mg./cm.}^2-\text{unit time)} = \frac{\text{Initial weight of sample} - \text{final weight of sample after exposure to dissolution medium for 1 hr.}}{\left(\frac{\text{Surface area of untreated sample} + \text{surface area of treated sample}}{2}\right)}$$

The results are summarized in Table 2 below.

Table 2

| Temperature, °C. | Dissolution rate, mg./cm.$^2$-hr. |
|---|---|
| 35–39 | 88.2 |
| 38–40 | 33.0 |
| 66–68 | 960.0 |
| 54–78 | 1038.0 |
| 93–100 | 2610.0 |
| 96–99 | 3474.0 |

The data show that the dissolution rate does not become significant until a temperature of about 70° C. is reached. At about 100° C. the dissolution rate was of the order of 3500 mg./cm.$^2$-hour.

EXAMPLE III

The effect of a halogen fluoride, such as bromine trifluoride, on the dissolution rate of a zirconium alloy, Zircaloy-2, is illustrated in the following example.

Samples of Zircaloy-2 were prepared and immersed in a dissolution medium for varying periods of time at controlled temperatures and the dissolution rates calculated as in Example II. In this experiment, however, the relative proportions of the components of the solution were varied. The calculated dissolution rates are shown in Table 3.

Table 3

| Dissolving Solution Composition, Mole Percent | | | Temperature, °C. | Dissolution Rate, mg./cm.$^2$-hr. |
|---|---|---|---|---|
| NO$_2$ | BrF$_3$ | HF | | |
| 17.5 | 82.5 | 0 | 23 | 7.2 |
| 18.9 | 81.1 | 0 | 103 | 28.2 |
| 18.9 | 81.1 | 0 | 114 | 49.8 |
| 18.9 | 81.1 | 0 | 114 | 57.0 |
| 18.9 | 81.1 | 0 | 150 | 66.0 |
| 11.0 | 26.4 | 62.5 | 30–99 | 2,646.0 |
| 24.0 | 0 | 76.0 | 60–78 | 1,038.0 |
| 0 | 26.4 | 74.6 | 150 | 0 |
| 0 | 0 | 100 | 150 | 0 |
| 0 | 100 | 0 | 150 | 0 |
| 100 | 0 | 0 | 150 | 0 |

These data indicate that the dissolution rate of Zircaloy-2 in nitrogen dioxide-bromine trifluoride is much lower than the dissolution rate in nitrogen dioxide-hydrogen fluoride. It will especially be noted that in all cases where the nitrogen dioxide complexing agent was not used, the zirconium did not dissolve. A similar pattern of results has been found to occur when the other complexing agents embraced by the present invention were used in place of nitrogen dioxide.

EXAMPLE IV

The effect of the addition of various halide salts to the bromine trifluoride-hydrogen fluoride dissolution medium is illustrated by the following example.

Several samples of Zircaloy-2 were treated as in the previous examples, and dissolution rates were determined at various temperatures in solutions of bromine trifluoride and hydrogen fluoride to which metal halide salts had been added. The amount of salt used was the same in each case. The dissolution rates are tabulated in Table 4.

*Table 4*

| Addition Agent to 15 ml. HF and 5 ml. BrF$_3$ | Temperature, ° C. | | Dissolution Rate, mg./cm.$^2$-hour |
|---|---|---|---|
| | Initial | Final | |
| AgCl | 77 | 121 | 438.0 |
| Hg$_2$F$_2$ | 92 | 88 | 30.6 |
| CsCl | 73 | 115 | 816.0 |
| KF | 92 | 121 | 2,448.0 |
| NaF | 93 | 120 | 39.0 |
| MnF$_3$ | 89 | 128 | 132.0 |
| TlF | 91 | 121 | 14.4 |
| NO$_2$ | 30 | 99 | 2,600 |

While all of the fluoride salts studied increased the dissolution rate of zirconium to some extent, the dissolution rate for cesium fluoride and potassium fluoride was higher by a degree of magnitude as compared to other halide salts used. The reason for the difference in dissolution rates between the various halide salts, and especially the enhanced dissolution rate achieved with KF and CsF is not understood. It has been suggested that in the solvent system used here KF and CsF are stronger basic fluorides than the other useful fluorides used.

EXAMPLE V

In this example, difluorophosphoric acid was used as the acid fluoride and potassium fluoride was used as the complexing agent. The results are shown in Table 5.

*Table 5*

| Dissolution Medium | | Temperature, ° C. | Dissolution Rate, mg./cm.$^2$-hour |
|---|---|---|---|
| KF, Grams | HPO$_2$F$_2$, ml. | | |
| 0 | 9 | 150-250 | 30.0 |
| 1 | 4 | 116 | 552.0 |

The enhanced dissolution rate achieved by adding potassium fluoride to the halogen acid dissolving medium will again be noted.

Although the foregoing discussion has been concerned primarily with the dissolution of uranium-bearing fuel elements in which the uranium is alloyed with zirconium or its alloys or is clad or sheathed in zirconium or its alloys, this invention is also applicable to the dissolution of fuel elements and other compositions in which uranium is combined with aluminum or stainless steel instead of zirconium and zirconium alloys. These metals have also been found to form tenacious fluoride coatings so that dissolution and subsequent recovery of uranium becomes a difficult problem. At a temperature in the range 120-180° C. a sample of 2S aluminum was dissolved in HF—NO$_2$ solvent (2:1 by volume). The reaction rate was found to be about 395 mg./cm.$^2$-hr. A slight increase in temperature (150-175° C.) of the dissolution medium is required in order to obtain dissolution rates for aluminum clad elements comparable to the high zirconium dissolution rates. Practical dissolution rates for stainless steel clad, uranium-bearing fuel elements are comparable to those for zirconium or aluminum at temperatures in the range 150 to 190° C. For example, at a temperature in the range 150-190° C. a sample of 304S stainless steel was dissolved in a HF—NO$_2$ solvent (2:1 by volume) at an average rate of reaction of 410 mg./cm.$^2$-hr. In all cases substantially complete recovery of uranium was obtained from compositions containing these metals.

It will thus be seen that I have described a process for facilitating recovery of uranium from mixtures of uranium a metal which forms an insoluble and tenacious fluoride coating which, prior to my invention, precluded efficient and quantitative recovery of uranium from such mixtures.

Whenever reference was made to an insoluble zirconium complex it will be understood that the zirconium complex is termed insoluble relative to the corresponding uranium complex on a mole for mole basis.

Since many embodiments might be made in the present invention and since many changes might be made in the embodiment described, it is to be understood that the foregoing description is to be interpreted as illustrative only and not in a limiting sense.

I claim:

1. An anhydrous process for separating uranium from a mixture of uranium and zirconium which comprises heating said mixture at a temperature in the range of 70 to 150° C. with a liquid consisting essentially of a stoichiometric amount of an inorganic acid fluoride and nitrogen dioxide, a complexing agent, which ionizes in said acid fluoride to convert the uranium to a soluble uranium complex and the zirconium to an insoluble zirconium complex respectively, and thereafter separating said zirconium complex from said uranium complex.

2. An anhydrous process for separating uranium from a mixture containing uranium, zirconium and fission products of uranium which comprises heating said mixture in a liquid consisting essentially of as active ingredients a stoichiometric amount of an acid fluoride and nitrogen dioxide, a complexing agent which reacts with said uranium and said zirconium to form a soluble uranium fluoride complex and an insoluble zirconium fluoride complex respectively, separating said zirconium complex from said uranium complex, heating said uranium complex and said fission products with a halogen fluoride in the liquid phase to thereby convert the uranium to uranium hexafluoride and at least a portion of said fission products to volatile fluorides and thereafter separating said uranium hexafluoride from said volatile fission product fluorides by fractional distillation.

3. An anhydrous method for separating uranium from a mixture containing uranium, zirconium and fission products of uranium which comprises reacting said mixture in a liquid consisting essentially of a stoichiometric amount of an acid fluoride and nitrogen dioxide at a temperature in the range 70 to 150° C. to convert the zirconium to a non-adherent insoluble zirconium complex compound, contacting the resultant reaction mixture with a liquid halogen fluoride to thereby convert the uranium to uranium hexafluoride and at least a portion of said fission products to volatile fluorides, and thereafter distilling said uranium hexafluoride from said volatile fluorides.

4. The method according to claim 3 wherein the concentration of nitrogen dioxide is at least 7 mole percent.

5. The method according to claim 3 wherein the acid fluoride is selected from the group consisting of hydrogen fluoride, fluophosphoric acid, monofluophosphoric acid and difluophosphoric acid.

6. The method according to claim 3 wherein the halogen fluoride is selected from the group consisting of chlorine trifluoride, bromine monofluoride, bromine trifluoride, bromine pentafluoride and iodine pentafluoride.

7. An anhydrous process for separating uranium from a mixture containing uranium, zirconium and fission products of uranium which comprises adding to said mixture in a liquid consisting essentially of as active ingredients stoichiometric amounts (1) a halogen fluoride, (2) an inorganic acid fluoride, and (3) nitrogen dioxide as a complexing agent which ionizes in said acid fluoride to convert the uranium to a soluble uranium complex, heating the resultant mixture to thereby convert the uranium to volatile uranium hexafluoride and at least a portion of said fission products to volatile fluorides and thereafter separating the uranium hexafluorides from the other volatile contaminants by fractional distillation.

References Cited in the file of this patent

UNITED STATES PATENTS

| | | |
|---|---|---|
| 2,758,024 | Feder | Aug. 7, 1956 |
| 2,811,413 | McMillan | Oct. 29, 1957 |

OTHER REFERENCES

Paramonova et al.: NSA 12, No. 20, Oct. 31, 1958, No. 13734.

Abstracting Zhur., Neorg. Khim, 3, pages 215–21 (1958).

TID–7534, May 20–25, 1957, Book 1, pp. 244–250 and Book 2, pp. 560–573.